Patented May 11, 1948

2,441,542

UNITED STATES PATENT OFFICE 2,441,542

COATED FABRIC

Robert R. Lawrence, Ludlow, Mass., assignor to Monsanto Chemical Company, St. Louis, Mo., a corporation of Delaware No Drawing. Application March 23, 1946, Serial No. 656,779

9 Claims. (Cl. 117—145)

This invention relates to coated fabrics. More particularly, this invention relates to fabrics coated with polyvinyl butyraldehyde acetal resin compositions.

Polyvinyl butyraldehyde acetal resin compositions have been found to be admirably suited for coating fabrics of various types and fabrics coated with such compositions have been finding increasing commercial use in recent years. However, it has been found that the range of usefulness of such products would be still further expanded if the coatings were to possess greater strength of adhesion to the fabric.

It is an object of this invention to provide improved coated fabrics. A particular object of this invention is to provide fabrics coated with polyvinyl butyraldehyde acetal resin compositions which possess increased adhesion to the fabric.

These and other objects are attained according to the present invention which comprises fabrics having a coating thereon comprising a polyvinyl butyraldehyde acetal resin composition containing as a thermosetting agent a phenol-aniline-aldehyde condensation product. Such coated fabrics are characterized by an unusually high adhesion of the coating to the fabric.

The following examples are illustrative of the coated fabrics of the invention, but are not to be construed as limitative thereof. Where parts are mentioned, they are parts by weight.

The polyvinyl butyraldehyde acetal resin employed in the examples is prepared from a polyvinyl acetate of such a degree of polymerization that a 1-molar benzene solution possesses a viscosity of substantially 50-55 centipoises at 20° C. The polyvinyl butyraldehyde acetal resin contains, on a weight basis, 16-20% hydroxyl groups calculated as polyvinyl alcohol, less than 3% acetate groups calculated as polyvinyl acetate, and the balance substantially butyraldehyde acetal.

The phenolic resin employed in Examples III, IV and VII is prepared by heating a mixture of 100 parts of phenol, 10 parts of aniline, 8 parts of barium hydroxide and 110 parts of an aqueous solution of formaldehyde (37% HCHO by weight) to its boiling point and then immediately dehydrating the reaction mixture by vacuum distillation until a brittle product is obtained. The product may then be ground to a fine powder for incorporation with the other ingredients of the coating compositions. The phenolic resin employed in Examples I and V is marketed under the trade name Amberol ST137 and is reported to be made by reacting formaldehyde and diisobutyl phenol under alkaline conditions.

The fabric is coated by forming a viscous solution of the organic ingredients in a solvent such as ethanol with the inorganic ingredients dispersed therein and applying the composition evenly to the fabric by means of a knife-type spreader and then evaporating off the solvent. The coated fabrics set forth in the examples in Table I are obtained by applying a sufficient number of coatings to build up a total coating weight of about 4-5 ounces per square yard on the 3-ounce nylon twill and 8-10 ounces on the 6-ounce nylon taffeta.

The adhesion values given in the examples are obtained by cutting strips of coated fabric 1 inch in width and wetting the coated portions of these strips with ethanol. Any excess ethanol is allowed to evaporate so as to leave a tacky film and the broad surfaces of two strips are pressed together, coating to coating. The cemented strips are then cured by heating for 1 hour at 135° C. The force required to pull apart the cemented strips is measured by means of a Scott L-5 testing machine operated at the rate of 20 inches per minute.

The tear strength values of the 3-ounce nylon given in the examples are relative values, both lengthwise and crosswise of coated fabric previously cured by heating at 135° C. for 1 hour and obtained by means of an Elmendorf testing machine with the augmenting attachment.

The tear strength values for the 6-ounce nylon given in the examples are measured by making two slits 1 inch apart and 1 inch long in a strip of coated fabric previously cured by heating at 135° C. for 1 hour. The force required to tear these two slits is measured on the Scott L-5 testing machine operated at a rate of 20 inches per minute. This test method is used since the tear strength of 6-ounce nylon is above the capacity of the Elmendorf tester using the usual type of test specimen.

Table I

| Example | I | II | III | IV |
|---|---|---|---|---|
| Polyvinyl butyraldehyde acetal resin | 100 | 100 | 100 | 100 |
| Butyl ricinoleate | 40 | 40 | 40 | 40 |
| Tri-(2-ethyl-hexyl) phosphate | 40 | 40 | 40 | 40 |
| Zinc oxide | 25 | 25 | 25 | 25 |
| Stearic oxide | 2 | 2 | 2 | 2 |
| Inorganic colors | 15 | 15 | 15 | 15 |
| Diisobutyl phenolaldehyde resin | 10 | | | |
| Phenol-aniline formaldehyde resin | | | 5 | 5 |
| Ethyl ether of tetra-methylol melamine | | 5 | | 1 |
| Adhesion values (lbs./in.): | | | | |
| 3-oz. nylon twill | 3.5 | 3.0 | 19 | 12 |
| 6-oz. nylon taffeta | 4.5 | 2.5 | 24 | 10 |
| Relative tear strengths: | | | | |
| 3-oz. nylon twill | 74 x 60 | 86 x 58 | 40 x 25 | 75 x 47 |
| 6-oz. nylon taffeta | 46 x 42 | 42 x 40 | 23 x 33 | 42 x 39 |

From the adhesion values given in the above examples, the unexpectedly high adhesive strengths of nylon fabric coated according to this invention are clearly evident. Thus, the use of phenol-aniline-formaldehyde resin leads to adhesive values several times as high as those obtained when either a conventional type of phenolic resin is employed, as illustrated by Example I, or when a melamine-formaldehyde resin is used, as illustrated in Example II. Example IV illustrates a further unexpected feature of the coated fabrics of the invention in that when phenol-aniline-formaldehyde resin is used in conjunction with a melamine-formaldehyde resin, not only are unusually high adhesion values obtained, but high tear strength values also result.

The results obtained according to this invention are particularly unexpected in view of the fact that a similar improvement is obtained with such a vastly different type of fabric as glass fabric. In Table II are given comparative adhesion values of coated glass fabric.

In Example V the thermosetting agent comprises a conventional type of phenolic resin. In Example VI a melamine-formaldehyde resin is used to produce thermosetting qualities. In contrast to the results obtained with these thermosetting agents, adhesion values two to three times as great are obtained when the thermosetting agent comprises a phenol-aniline-formaldehyde resin.

Each of the three examples in Table II contains approximately the same relative proportions of polyvinyl butyraladehyde acetal resin, plasticizer and inorganic filler. The glass fabric is a fabric marketed by Owens-Illinois Glass Company under the designation ECC-164 and the total coating weight is 7-10 ounces per square yard.

*Table II*

| Example | Thermosetting agent | Adhesion values, lbs./in. |
| --- | --- | --- |
| V | Di-isobutyl phenol-formaldehyde resin | 6.5-8 |
| VI | Ethyl ether of tetra-methylol melamine | 4-4.5 |
| VII | Phenol-aniline-formaldehyde resin | 11-15.5 |

The coated fabrics of the invention have a wide variety of uses by virtue of the superior adhesive characteristics of the coating. Thus, such products are of particular value in making raincoats, hospital sheeting, upholstery coverings, curtain material and other articles which are subject to harsh use.

In addition to nylon and glass fabrics, other fabrics such as cotton, wool, rayon, Vinyon, Saran and the like may be coated in accordance with this invention to provide products which are characterized by unusually high adhesion to the coating.

Instead of applying the compositions of the invention to fabrics from solution, other methods of coating may be used, as for example, calendering. Thus, all of the ingredients except the resinous curing agent are given a preliminary mixing in a Baker-Perkins mixer for about 20 minutes at room temperature to thoroughly disperse the several ingredients without colloiding the mixture. Thereafter, the mixture is charged into a Banbury mixer heated to 105° C. and mixed at this temperature for about 20 minutes. The resinous curing agent is added after the mixing has proceeded for about 15 minutes, i. e., mixing is continued for about 5 minutes after the curing agent is added. The colloided composition is finally transferred to constant speed mixing rolls and formed into slabs about ½ inch thick. The resulting slabs may be placed on a two-roll rubber mill and heated to a temperature providing suitable plasticity, e. g., 100° C. Thereafter, the plastic is charged to a three or four-roll calender with roll temperatures of about 100° C. The coating is applied to the fabric between the bottom rolls. The coated fabric may then be reeled into rolls of desired size for storage and/or shipment. Generally, it is desirable to apply a material to the coated fabric to prevent sticking, e. g., talc.

When it is desired to perform the coating from a solution, the slab prepared as described above for the purpose of calendering, may be dissolved in a suitable solvent in a rubber churn. A suitable solution is obtained by dissolving 45 parts of the solid slab in a mixture of 35 parts of ethanol and 25 parts of rubber solvent naphtha.

Another method of applying the coating composition to fabrics is to pass the fabric through the nozzle of a sheet extrusion device and simultaneously extrude a coating of the polyvinyl butyraldehyde acetal resin composition of the invention thereon.

Thereafter, irrespective of the method of applying the coating, it may be converted into the insoluble state by heating at an elevated temperature, e. g., one hour at 135° C. This may be done by unwinding the rolls of coated fabric and either continuously passing the coated fabric through an oven at a suitable temperature or otherwise suitably exposing the coated fabric to elevated temperatures. In some cases, it may be desirable to form the desired garment or other article prior to curing. If this procedure is followed, it is possible to form cemented seams during the curing process by keeping overlapped sections of the coated fabric under moderate pressure during the exposure to elevated temperatures.

Numerous variations may be introduced into the invention as illustrated by the examples. Thus, other plasticizers well known to those skilled in the art may be used in place of the plasticizers set forth in the examples, usually in the proportion of 50-150 parts per 100 parts of acetal resin. The coating weight may be widely varied, depending on the end use for the coated product. In place of the phenol-aniline-formaldehyde resin used in the examples, other phenol-aniline-formaldehyde resins may be used, for example, phenolic resins in which 5-25 parts of aniline are reacted with formaldehyde for every 100 parts of phenol. The reaction is preferably carried out under alkaline conditions and such alkaline condensing agents as sodium hydroxide, sodium carbonate, potassium hydroxide, barium hydroxide, calcium hydroxide; quaternary ammonium bases and other alkaline condensing agents non-volatile under usual reaction conditions may be used. The proportion of formaldehyde is such that on a molar basis it is at least equal to the sum of the mols of the phenol and the aniline. Usually the mols of formaldehyde used are not more than 2-3 times the sum of the mols of phenol and aniline.

The proportion of phenol-aniline-formaldehyde resin may be substantially varied. Usually the proportion is between 2 and 50 parts for every 100 parts of the polyvinyl acetal resin and for most purposes, 5-30 parts are preferred.

When desired, the zinc oxide may be omitted from the compositions described in Examples IV and V in preparing infusible, insoluble compositions, but the curing time is thereby increased. Usually, it is found advisable to include zinc oxide, or another metal oxide such as magnesium oxide (MgO), tin oxide (SnO), antimony oxide (Sb$_2$O$_3$), chromium oxide (Cr$_2$O$_3$) and the like. The proportion of metal oxide found desirable is usually 5–30 parts for every 100 parts of polyvinyl butyraldehyde acetal resin.

It is to be understood that conventional types of additives and modifiers may be included in the compositions of the invention (some of which have been shown in the examples), such as other plasticizers, resins, lubricants, fillers (e. g. carbon black), dyestuffs, pigments and the like. For example, the inclusion of 1–2 parts of a lubricant per 100 parts of acetal resin, as illustrated by the use of 2 parts of stearic acid in Examples IV and V, is desirable to facilitate calendering or other forming processes.

The polyvinyl butyraldehyde acetal resins used in the compositions of the invention may be prepared, for example, by hydrolyzing a polyvinyl ester, for example, polyvinyl acetate, and then reacting the resulting hydrolysis product with butyraldehyde. These resins may contain a certain proportion of ester and hydroxyl groups in addition to the acetal group. U. S. patent to Morrison et al., Reissue 20,430, dated June 20, 1937, illustrates suitable methods for preparing polyvinyl acetal resins, in general.

When the polyvinyl butyraldehyde acetal resins contain ester groups, the nature of the ester groups may be substantially varied, but preferably such groups are residues of saturated lower aliphatic acids such as formic, acetic, propionic and butyric acids. The polyvinyl esters from which the polyvinyl acetal resins may be derived may vary substantially in degree of polymerization as evidenced by the viscosity of 1-molar benzene solutions. For example, such solutions may vary in viscosity from 5 to 75 centipoises at 20° C.

The polyvinyl butyraldehyde acetal resins contemplated according to the present invention have at least about 30% of the ester groups in the original polyvinyl ester replaced by acetal groups and do not have more than about 50% of said ester groups replaced by hydroxyl groups.

According to one embodiment of this invention, the polyvinyl acetal resins employed contain, on a weight basis, 5–25% hydroxyl groups calculated as polyvinyl alcohol, and preferably 10–20% hydroxyl groups. These resins may also contain up to 30% ester groups calculated as polyvinyl ester, the ester groups preferably being acetate groups.

For certain purposes, it is desirable that the resins employed contain, on a weight basis, 10–20% hydroxyl groups calculated as polyvinyl alcohol and 15–30% acetate groups calculated as polyvinyl acetate and the balance substantially butyraldehyde acetal. For other purposes, it is preferred that the resin employed be made up, on a weight basis, of 16–20% hydroxyl groups calculated as polyvinyl alcohol, less than 3% acetate groups calculated as polyvinyl acetate and the balance substantially butyraldehyde acetal. For some purposes, the acetal resin is made up, on a weight basis, of 10–12% hydroxyl groups calculated as polyvinyl alcohol, less than 3% acetate groups calculated as polyvinyl acetate and the balance substantially butyraldehyde acetal.

The foregoing description is given in illustration and not in limitation of the invention as set forth in the appended claims.

What is claimed is:

1. A fabric having a coating thereon comprising a polyvinyl butyraldehyde acetal resin containing, on a chemical equivalent basis, at least 30% acetal groups and not more than 50% hydroxyl groups, and 2–50 parts of phenol-aniline-formaldehyde resin per 100 parts of acetal resin, said phenol-aniline resin containing 5–25 parts of combined aniline for every 100 parts of combined phenol.

2. A fabric having a coating thereon comprising a polyvinyl butyraldehyde acetal resin containing, on a weight basis, 5–25% hydroxyl groups calculated as polyvinyl alcohol, up to 30% acetate groups calculated as polyvinyl acetate and the balance substantially butyraldehyde acetal, a plasticizer and 2–50 parts of a phenol-aniline-formaldehyde resin per 100 parts of acetal resin, said phenol-aniline-resin containing 5–25 parts of combined aniline for every 100 parts of combined phenol.

3. A product as defined in claim 2 in which the fabric is a nylon fabric.

4. A product as defined in claim 2 in which the fabric is a glass fabric.

5. A product as defined in claim 2 in which the fabric is a cotton fabric.

6. A fabric having a thermoset coating strongly adherent thereon, comprising the product resulting from heat treating a composition comprising a polyvinyl butyraldehyde acetal resin containing, on a weight basis, 16–20% hydroxyl groups calculated as polyvinyl alcohol, less than 3% acetate groups calculated as polyvinyl acetate and the balance substantially butyraldehyde acetal, 50–150 parts of a compatible plasticizer and 5–30 parts of a phenol-aniline-formaldehyde resin per 100 parts of acetal resin, said phenol-aniline resin containing 5–25 parts of combined aniline for every 100 parts of combined phenol.

7. A product as defined in claim 6 in which the fabric is nylon.

8. A product as defined in claim 6 in which the fabric is glass.

9. A product as defined in claim 6 in which the fabric is cotton.

ROBERT R. LAWRENCE.

REFERENCES CITED

The following references are of record in the file of this patent:

UNITED STATES PATENTS

| Number | Name | Date |
|---|---|---|
| 2,002,601 | Gams et al. | May 28, 1935 |
| 2,268,121 | Kingsley | Dec. 30, 1941 |
| 2,307,588 | Jackson et al. | Jan. 5, 1943 |
| 2,374,067 | Aldersol | Apr. 17, 1945 |
| 2,396,098 | Haas | Mar. 5, 1946 |